United States Patent Office 3,202,573
Patented Aug. 24, 1965

3,202,573
PROPARGOXYPHENYL N-METHYLCARBAMATES AND THEIR USE AS PESTICIDES
Albert H. Haubein, Newark, Del., assignor to Hercules Powder Company, Wilmington, Del., a corporation of Delaware
No Drawing. Filed May 31, 1961, Ser. No. 113,673
6 Claims. (Cl. 167—30)

This invention relates to new compositions of matter having pesticidal activity, and more particularly relates to propargoxyphenyl N-methylcarbamates and to their utilization as pesticide toxicants.

In accordance with the present invention, it has been found that o-, m-, and p-propargoxyphenyl N-methylcarbamates having the structural formula

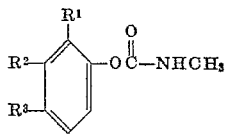

in which one of $R^1$, $R^2$, and $R^3$ represents $$CH\equiv C-CH_2O-$$

and the other two represent hydrogen, are new compounds, which when dispersed in insecticidal compositions, have high toxicity to insects contacted therewith and low toxicity to mammals.

The propargoxyphenyl N-methylcarbamates are prepared by the reaction of the corresponding propargoxyphenol with phosgene to produce the chlorocarbonate and reacting the latter with methylamine, or by reacting the propargoxyphenol with methylisocyanate.

The method of preparing and using the propargoxyphenyl N-methylcarbamates is illustrated in the following examples in which all parts and percentages are by weight.

EXAMPLE 1

*Preparation of m-propargoxyphenol*

To a solution of 990 parts resorcinol in 2375 parts acetone containing 1240 parts added potassium carbonate was added 224 parts propargylchloride. This mixture was refluxed 12 hours at about 58° C., and then the resulting inorganic salt mixture was separated by filtration and the organic product recovered by distilling off the acetone. The organic product was purified by forming an aqueous alkali metal salt solution thereof, washing with benzene, and acidifying the aqueous layer to liberate the phenol which was then extracted into benzene. From the benzene solution 350 parts of m-propargoxyphenol was recovered by distilling off the benzene. The m-propargoxyphenol was further purified by distilling at 105–110° C./0.5 mm.

*Preparation of m-propargoxyphenyl N-methylcarbamate*

(I) To a solution of 42 parts phosgene in 400 parts toluene at −10° C. was added dropwise 62 parts m-propargoxyphenol and 50 parts dimethylaniline. After standing 16 hours at 25° C., the reaction mixture was washed with sufficient 10% hydrochloric acid to remove the excess dimethylaniline, and the organic solution was then dried over anhydrous sodium sulfate and distilled to recover 42 parts m-propargoxyphenyl chlorocarbonate B.P. 94–100° C./0.65–0.7 mm. To a solution of 42 parts m-propargoxyphenyl chlorocarbonate in benzene 33 parts 40% aqueous methylamine was added dropwise at 20° C. When this reaction was complete, the organic layer was washed with water, and the product was recovered from the organic layer by drying and distilling off the benzene. The resulting m-propargoxyphenyl N-methylcarbamate amounting to 39 parts and analyzing 6.07% N (theory 6.84%) slowly crystallized. After recrystallization from a benzene-petroleum ether mixture, a melting point of 72–73° C. was obtained; analysis 6.74% N.

(II) To a solution of 228 parts m-propargoxyphenol and 40 parts triethylamine in 350 parts benzene was added dropwise 200 parts 48% methylisocyanate in toluene. After 16 hours at 25° C. this reaction mixture was cooled to crystallize the product. There was thus obtained 221 parts of m-propargoxyphenyl N-methylcarbamate as a first crop and, after concentration of the mother liquor, 38 parts as a second crop. The melting point of recrystallized product was 72–73° C.

The m-propargoxyphenyl N-methylcarbamate was dissolved in about an equal weight of benzene and about an equal weight of "Tween 20" (a sorbitol monolaurate polyoxyethylene derivative) as a surface-active agent. This composition of m-propargoxyphenyl N-methylcarbamate and a surface-active agent was then diluted with sufficient water to make aqueous dispersions of various concentrations. These were then tested as insecticide sprays against various insects. The test results are tabulated below.

| Concentration, Percent | Percent Kill | | | | | | |
|---|---|---|---|---|---|---|---|
| | 1 | 0.5 | .1 | .05 | .025 | .01 | .0025 |
| Insect: | | | | | | | |
| Housefly | 100 | | | | 80 | 44 | |
| Mexican Bean Beetle | 100 | | | | | | 55 |
| Pea Aphid | | | 100 | | 100 | | 55 |
| Southern Army Worm | 100 | | | | 95 | 75 | |
| Two-Spotted Mite | | | | 60 | 95 | 70 | |
| Tarnished Plant Bug | 100 | | | 90 | | | |
| Plum Curculio | 100 | | | 20 | | | |

EXAMPLE 2 o-Propargoxyphenyl N-methylcarbamate prepared from o-propargoxyphenol and methylisocyanate following procedure II of Example 1 melted at 83–85° C. and analyzed 6.60% N. It was tested as an insecticide in the same manner as the meta isomer in aqueous emulsion compositions, and the following results were obtained:

| Concentration, Percent | Percent Kill | | | |
|---|---|---|---|---|
| | 0.1 | 0.05 | 0.025 | 0.005 |
| Insect: | | | | |
| Housefly | 100 | | 100 | |
| Mexican Bean Beetle | 100 | 100 | 100 | 100 |
| Pea Aphid | 100 | 100 | 100 | |
| Southern Army Worm | 100 | 100 | 100 | |
| Two-Spotted Mite | 100 | | 80 | |
| Tarnished Plant Bug | 100 | 95 | | |
| Plum Curculio | 100 | | | | o-Propargoxyphenyl N-methylcarbamate is superior to the corresponding meta and para isomers in insecticidal activity. The para isomer was prepared by an analogous method to those described for the metal isomer. It melted at 127–9° C., contained by analysis 6.78% N, and while not as good as the meta isomer in insecticidal activity, it does have some utility in this respect and is useful also as a plant response agent.

Similar toxicity results were obtained using, as surface-active dispersant compositions, wettable powders, aqueous emulsions, dusts of clays which had been mixed with concentrated solutions of the m-propargoxyphenyl N-methylcarbamate, and deodorized kerosene solutions of the m-propargoxyphenyl N-methylcarbamate.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum and the like in many of the formulations suggested below.

The compounds of this invention are made into pesticidal compositions for use against insects and mites by dilution with a dispersant which is in itself toxicologically inert but has surface-active properties and acts as a carrier therefor, by dispersing in a liquid dispersant such as an organic solvent, or water, or by diluting with a solid insecticide dispersant as a carrier. These dispersants all act as surface-active agents in effecting dispersion of the toxicant. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant and dispersant.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of a compound of this invention and a surface-active agent. The concentrate may also contain sufficient amounts of organic solvents to aid in effective dispersion. The amount of surface-active agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, Second Edition (1948), pages 280–287) for use with known insecticides and include neutral soaps of resin, alginic and fatty acids and alkali metals or alkyl-amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

In using the insecticidal compound of this invention for killing insects, the toxic compound acts by contact with the insects, and the insects may be contacted directly with the propargoxyphenyl N-methylcarbamate in a dispersion and indirectly by contacting the habitats of the insects with the propargoxyphenyl N-methylcarbamate.

What I claim and desire to protect by Letters Patent is:
1. A propargoxyphenyl N-methylcarbamate.
2. The compound o-propargoxyphenyl N-methylcarbamate.
3. The compound m-propargoxyphenyl N-methylcarbamate.
4. A composition capable of insecticidal activity when dispersed comprising a propargoxyphenyl N-methylcarbamate in admixture with a surface-active agent as a dispersant therefor.
5. An insecticidal dispersion comprising a propargoxyphenyl N-methylcarbamate in minor amount and a dispersant with surface-active properties in major amount.
6. The method of killing insects which comprises contacting insects directly and indirectly with a propargoxyphenyl N-methylcarbamate.

References Cited by the Examiner

UNITED STATES PATENTS

| | | | |
|---|---|---|---|
| 2,209,245 | 7/40 | Bartholomaus | 260—479 |
| 2,776,197 | 1/57 | Gysin et al. | 260—479 |

FOREIGN PATENTS 802,557  10/58  Great Britain.

OTHER REFERENCES

Kolbezen et al.: Journal Agriculture and Food Chemistry, 2 864–70 (1954).

LORRAINE A. WEINBERGER, Primary Examiner.

ABRAHAM H. WINKELSTEIN, Examiner.